United States Patent
Park et al.

(10) Patent No.: US 8,355,006 B2
(45) Date of Patent: *Jan. 15, 2013

(54) LIQUID CRYSTAL DISPLAY

(75) Inventors: Changkeun Park, Daegu (KR); Suhwan Moon, Kyungbuk (KR); Minkyung Lee, Kyungbuk (KR); Deuksu Lee, Gyeonggi-do (KR); Taehwan Kim, Seoul (KR); Miyoung Do, Gyeonggi-do (KR); Kyohyuck Choo, Gyeonggi-do (KR); Ilho Kim, Incheon (KR); Shinkwon Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 961 days.

This patent is subject to a terminal disclaimer.

(21) Appl. No.: 12/318,422

(22) Filed: Dec. 29, 2008

(65) Prior Publication Data

US 2009/0315840 A1 Dec. 24, 2009

(30) Foreign Application Priority Data

Jun. 24, 2008 (KR) .................. 10-2008-0059896

(51) Int. Cl.
*G06F 3/041* (2006.01)
(52) U.S. Cl. ........................ 345/173; 345/156
(58) Field of Classification Search .................. 345/156, 345/173–175, 177, 104; 178/18.01–18.07, 178/19.01–19.05
See application file for complete search history.

(56) References Cited

U.S. PATENT DOCUMENTS

| | | | |
|---|---|---|---|
| 5,949,408 A | 9/1999 | Kang et al. | |
| 7,385,594 B2 * | 6/2008 | Liao et al. | 345/173 |
| 8,049,732 B2 * | 11/2011 | Hotelling et al. | 345/173 |
| 2005/0275616 A1 * | 12/2005 | Park et al. | 345/102 |
| 2006/0146038 A1 * | 7/2006 | Park et al. | 345/173 |
| 2008/0143682 A1 * | 6/2008 | Shim et al. | 345/173 |
| 2008/0158175 A1 * | 7/2008 | Hotelling et al. | 345/173 |
| 2008/0158178 A1 * | 7/2008 | Hotelling et al. | 345/173 |
| 2008/0180399 A1 * | 7/2008 | Cheng | 345/173 |
| 2008/0263445 A1 * | 10/2008 | Park | 715/702 |
| 2009/0135115 A1 * | 5/2009 | Sakamoto et al. | 345/84 |
| 2009/0267917 A1 * | 10/2009 | Lee et al. | 345/174 |

* cited by examiner

*Primary Examiner* — Ricardo L Osorio
(74) *Attorney, Agent, or Firm* — Morgan, Lewis & Bockius LLP

(57) ABSTRACT

A liquid crystal display is disclosed. The liquid crystal display includes a liquid crystal display panel including a pixel array and touch sensors, a transparent conductive layer on one substrate of the liquid crystal display panel transmitting display light, a polarizing plate on the transparent conductive layer, a driving voltage supply circuit, and a signal transmitting unit electrically connecting the transparent conductive layer to the driving voltage supply circuit. A portion of the transparent conductive layer is connected to a ground level voltage source. The driving voltage supply circuit generates a driving voltage required to perform light sensing operations of the touch sensors during a touch period based on changes in an amount of surface charge of the transparent conductive layer depending on whether or not the polarizing plate is touched.

6 Claims, 13 Drawing Sheets

When a liquid crystal display panel
was not touched

When a liquid crystal display panel was touched

LIQUID CRYSTAL DISPLAY

This application claims the benefit of Korea Patent Application No. 10-2008-0059896 filed on Jun. 24, 2008, which is incorporated herein by reference for all purposes as if fully set forth herein.

BACKGROUND OF THE INVENTION

1. Field of the Invention

The present invention relates to an in-cell touch panel type liquid crystal display, and more specifically to a liquid crystal display capable of accurately sensing whether or not a liquid crystal display panel is touch.

2. Discussion of the Related Art

A liquid crystal display (LCD) displays an image by controlling light transmitted through a liquid crystal layer using an electric field generated in response to a video signal and applied to the liquid crystal layer. Because the liquid crystal display is a thin, small-sized flat panel display device with low power consumption, the liquid crystal display has been used in personal computers such as notebook PCs, office automation equipment, audio/video equipment, and the like. In particular, because an active matrix type liquid crystal display includes a switching element in each liquid crystal cell that is actively controlled, the active matrix type liquid crystal display is advantageous in displaying a moving picture. A thin film transistor (TFT) has been mainly used as the switching element of the active matrix type liquid crystal display.

In general, an active matrix type liquid crystal display converts digital video data into an analog data voltage based on a gamma reference voltage. As shown in FIG. 1, the analog data voltage is then applied to a data line DL while a scan pulse is applied to a gate line GL. The scan pulse activates a thin film transistor TFT connected thereto, thereby charging a liquid crystal cell Clc with the data voltage on the data line DL. The thin film transistor TFT includes a gate electrode connected to the gate line GL, a source connected to the data line DL, and a drain electrode commonly connected to a pixel electrode of the liquid crystal cell Clc and one electrode of a storage capacitor Cst. A common voltage Vcom is applied to a common electrode of the liquid crystal cell Clc. When the scan pulse is applied to the gate line GL, the thin film transistor TFT is turned on, and a channel is formed between the source and drain electrodes of the thin film transistor TFT. Hence, a voltage on the data line DL is supplied to the pixel electrode of the liquid crystal cell Clc. Additionally, when the thin film transistor TFT is turned on, the storage capacitor Cst is charged with the data voltage applied through the data line DL, thereby keeping the voltage level of the liquid crystal cell Clc constant. The orientation of liquid crystal molecules in the liquid crystal cell Clc changes due to an electric field generated between the pixel electrode and the common electrode, thereby changing the incident light. Because the liquid crystal display is generally a light receiving element (i.e., liquid crystals do not generate light), the liquid crystal display adjusts luminance of the screen using light produced by a backlight unit formed in the rear of a liquid crystal display panel.

Recently, a touch screen panel attached to the liquid crystal display has been proposed. The touch screen panel generally attached on the liquid crystal display is a user interface that detects changes in electrical characteristics at a touch position where an opaque object, such as a finger or a pen, contacts the touch screen panel. When a user's finger or a touch pen contacts the screen of the touch screen panel of the liquid crystal display, a display device detects the information of the touch position and uses the information for various applications.

However, the touch screen panel of the liquid crystal display generally increases the manufacturing cost of the liquid crystal display, may reduce the manufacturing yield due to the added process of attaching the touch screen panel to the liquid crystal display, may reduce brightness of the liquid crystal display, increases the thickness of the liquid crystal display, and the like.

To solve the above-described problems, rather than attaching a touch screen panel, an in-cell touch panel type liquid crystal display has been proposed. An in-cell touch panel type liquid crystal display includes a touch sensor circuit including a sensor thin film transistor (TFT) formed inside the liquid crystal cell Clc of the liquid crystal display. As shown in FIG. 2, the touch sensor circuit includes a sensor TFT that changes a light current "i" depending on changes in the amount of external light coming into the panel, a sensor capacitor Cst2 that stores a charge generated by the light current "i," and a switching TFT that switches on and off an output of the charge stored in the sensor capacitor Cst2. A bias voltage Vbias is supplied to a gate electrode of the sensor TFT and is set at a voltage level equal to or smaller than a threshold voltage of the gate electrode of the sensor TFT.

In the touch sensor circuit shown in FIG. 2, the light current (i) of a sensor TFT in a touch area is larger than the light current of a sensor TFT in a non-touch area when the outside environment is darker than the backlight (e.g., indoors). On the other hand, the light current (i) of a sensor TFT in a touch area is smaller than the light current of a sensor TFT in a non-touch area when the outside environment is brighter than the backlight (e.g., outdoors). In either circumstance, a light sensing signal produced in the touch area is different than a light sensing signal in the non-touch area. Accordingly, the liquid crystal display detects the touch position information based on the light sensing signals of the touch sensor circuit.

Because the related art in-cell touch panel type liquid crystal display detects the touch position based on only a relative difference between the light currents flowing in the sensor TFTs, detection of whether or not the liquid crystal display panel is actually touched cannot be determined accurately. For example, FIG. 3A shows that if the user's fingers approach the liquid crystal display without touching the liquid crystal display in a strong illuminance environment (e.g., outdoor environment), the related art in-cell touch panel type liquid crystal display may not be able distinguish from an actual touch condition shown in FIG. 3B. This reduces the sensing accuracy, thereby causing a maloperation of the liquid crystal display.

SUMMARY OF THE INVENTION

Accordingly, the present invention is directed to a liquid crystal display that substantially obviates one or more problems due to limitations and disadvantages of the related art.

An object of the present invention is to provide a liquid crystal display with improved sensing accuracy.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display comprises a liquid crystal display panel including a pixel array that displays an image and touch sensors that sense a touch position depending on an amount of receiving light, a transparent conductive layer on one substrate of the liquid crystal display panel transmitting display light, a portion of the transparent conductive layer being connected to a ground level voltage source, a polarizing plate on the transparent conductive layer, a driving voltage supply circuit to generate a driving voltage required to perform light sensing operations of the touch sensors during a touch period based on changes in an amount of surface charge of the transparent conductive layer depending on whether or not the polarizing plate is touched, and a signal transmitting unit to electrically connect the transparent conductive layer to the driving voltage supply circuit.

When a user touches the polarizing plate with his or her finger, the polarizing plate serves as a dielectric to form an equivalent capacitor between the user's finger and the transparent conductive layer. The amount of surface charge of the transparent conductive layer has a different value during touch and non-touch operations.

The polarizing plate includes a conductive layer and a dielectric layer between the conductive layer and the one substrate of the liquid crystal display panel. When a user touches the polarizing plate with his or her finger, the dielectric layer serves as a dielectric to form an equivalent capacitor between the conductive layer and the transparent conductive layer. The amount of surface charge of the transparent conductive layer has a different value during touch and non-touch operations.

The signal transmitting unit includes a touch output pad on another substrate of the liquid crystal display panel, a conductive tape to electrically connect the transparent conductive layer to one surface of the touch output pad, a printed circuit board on which the driving voltage supply circuit is mounted, and a flexible wiring film to electrically connect another surface of the touch output pad to the printed circuit board.

The signal transmitting unit includes a printed circuit board on which the driving voltage supply circuit is mounted, and a flexible wiring film to electrically connect the transparent conductive layer to the printed circuit board.

In another aspect, a liquid crystal display comprises a liquid crystal display panel including a pixel array that displays an image and touch sensors that sense a touch position depending on an amount of receiving light, a first transparent conductive layer on one substrate of the liquid crystal display panel transmitting display light, the transparent conductive layer being connected to a ground level voltage source, a polarizing plate on the first transparent conductive layer, a second transparent conductive layer that is formed on the polarizing plate to be exposed to the outside, the first and second transparent conductive layers being on opposite sides of the polarizing plate, a driving voltage supply circuit to generate a driving voltage required to perform light sensing operations of the touch sensors during a touch period based on changes in an amount of surface charge of the second transparent conductive layer depending on whether or not the second transparent conductive layer is touched, and a signal transmitting unit to electrically connect the second transparent conductive layer to the driving voltage supply circuit.

When a user touches the second transparent conductive layer with his or her finger, the polarizing plate serves as a dielectric to form an equivalent capacitor between the first and second transparent conductive layers. The amount of surface charge of the second transparent conductive layer has a different value during touch and non-touch operations.

In still another aspect, a liquid crystal display comprises a liquid crystal display panel including a pixel array that displays an image and touch sensors that sense a touch position depending on an amount of receiving light, a polarizing plate on one substrate of the liquid crystal display panel transmitting display light, the polarizing plate including a conductive layer, a driving voltage supply circuit to generate a driving voltage required to perform light sensing operations of the touch sensors during a touch period based on changes in an amount of surface charge of the conductive layer depending on whether or not the polarizing plate is touched, and a signal transmitting unit to electrically connect the conductive layer to the driving voltage supply circuit.

When a user touches the polarizing plate with his or her finger, a dielectric layer on the conductive layer serves as a dielectric to form an equivalent capacitor between the user's finger and the conductive layer. The amount of surface charge of the conductive layer has a different value during touch and non-touch operations.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Figure 1:
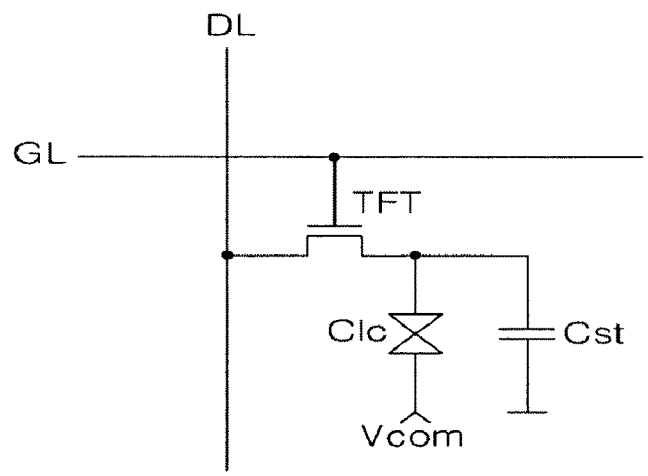
FIG. 1 is an equivalent circuit diagram of an active matrix type liquid crystal display.
Figure 2:
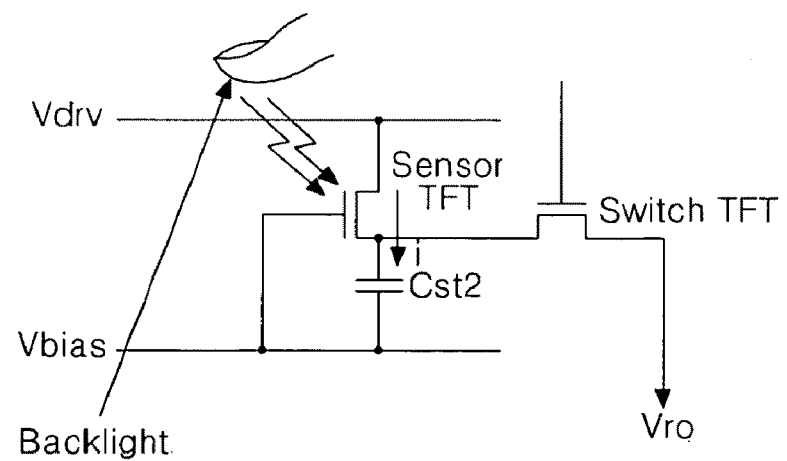
FIG. 2 is a diagram for explaining an operation of a touch sensor circuit.
Figure 3A:
FIGS. 3A and 3B are diagrams showing when a liquid crystal display panel was not touched and was touched, respectively.
Figure 3B:
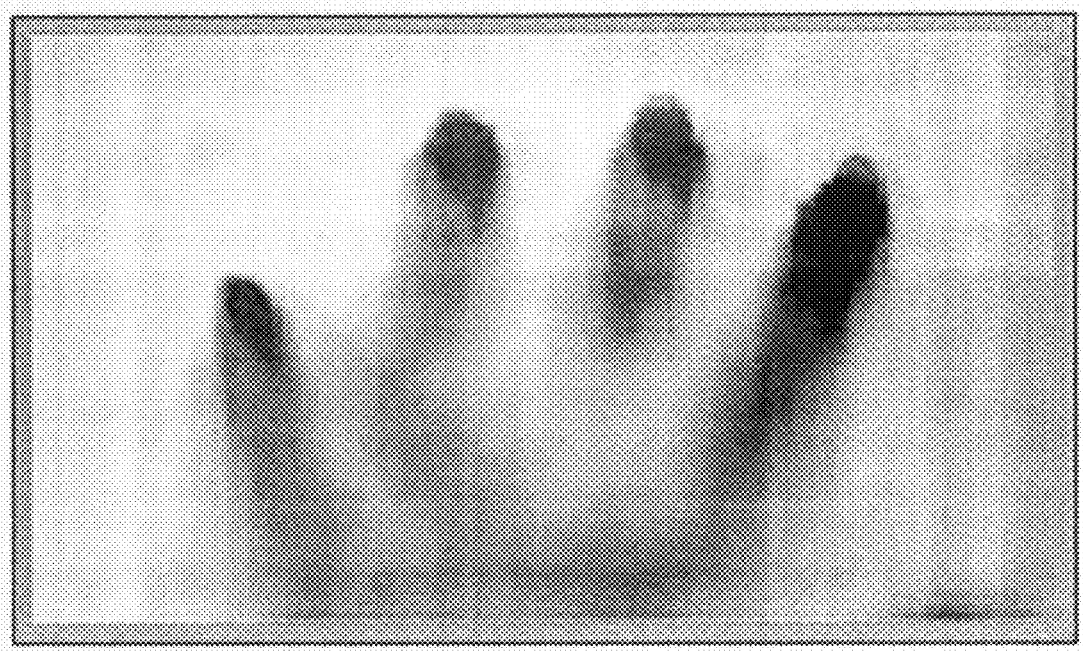
Figure 4:
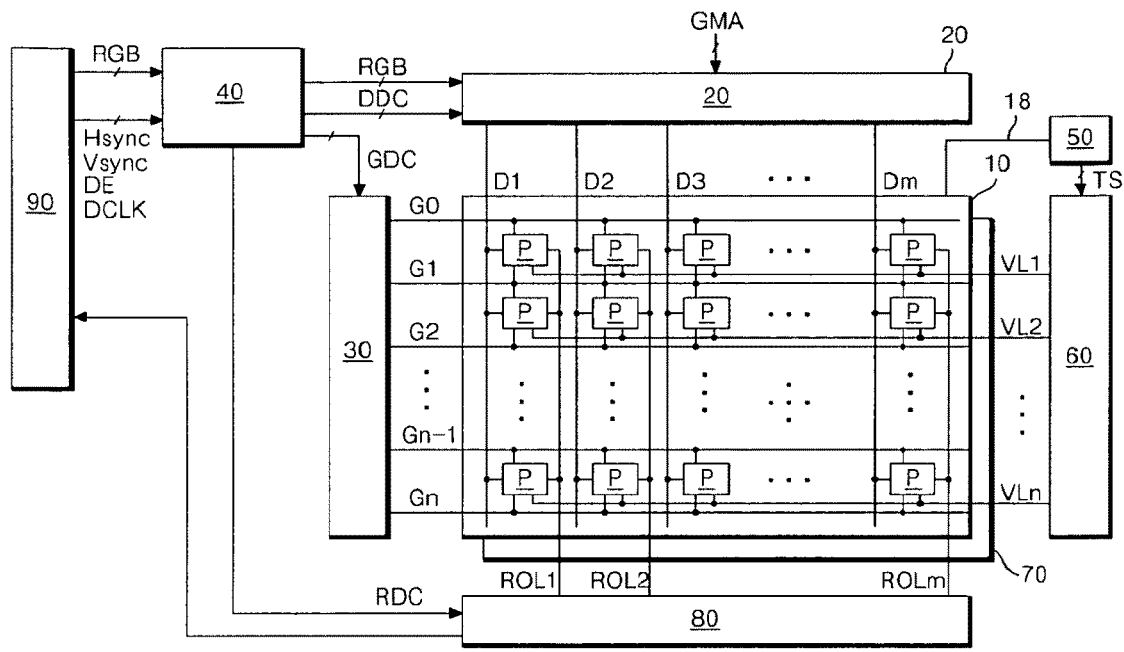
FIG. 4 is a block diagram of a liquid crystal display according to an exemplary embodiment of the invention.

FIG. 4 is a block diagram of a liquid crystal display according to an exemplary embodiment of the invention. As shown in FIG. 4, the liquid crystal display according to the exemplary embodiment of the invention includes a liquid crystal display panel 10, a data drive circuit 20, a gate drive circuit 30, a timing controller 40, a sensing circuit 50, a driving voltage supply circuit 60, a backlight unit 70, and a readout integrated circuit (IC) 80. The liquid crystal display panel 10 includes a plurality of gate lines G0 to Gn, a plurality of data lines D1 to Dm, a plurality of driving voltage supply lines VL1 to VLn, and a pixel P having a touch sensor circuit at each crossing of the lines G0 to Gn, D1 to Dm, and VL1 to VLn.

The data drive circuit 20 supplies a data voltage to the data lines D1 to Dm, and the gate drive circuit 30 supplies a scan pulse to the gate lines G0 to Gn. The timing controller 40 controls drive timing of the data drive circuit 20 and the gate drive circuit 30. The sensing circuit 50 senses whether or not a user touches the liquid crystal display panel 10 with his or her finger and generates a touch/non-touch sensing signal TS. The driving voltage supply circuit 60 changes the level of a driving voltage required to drive the touch sensor circuit inside the pixel P depending on the touch/non-touch sensing signal TS and supplies the changed driving voltages to the driving voltage supply lines VL1 to VLn. The backlight unit 70 is positioned in the rear of the liquid crystal display panel 10 and produces light. The readout IC 80 is commonly connected to readout lines ROL1 to ROLm of the liquid crystal display panel 10.

Figure 14:
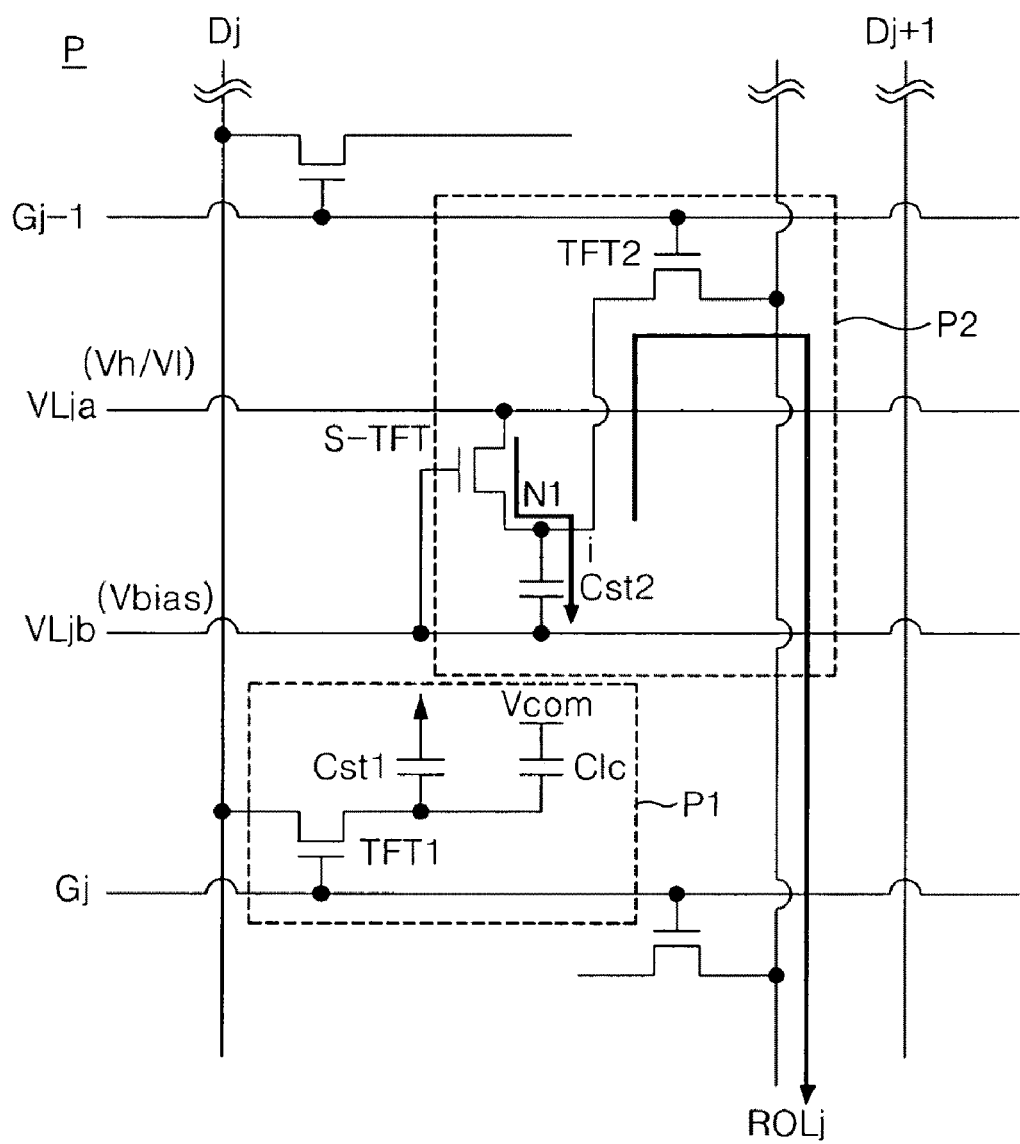
FIG. 14 is an equivalent circuit diagram of a pixel shown in FIG. 4.

The liquid crystal display panel 10 includes an upper substrate including a color filter, a lower substrate on which a pixel circuit and the pixels P are formed, and a liquid crystal layer interposed between the upper substrate and the lower substrate. The data lines D1 to Dm cross the gate lines G0 to Gn on the lower substrate of the liquid crystal display panel 10. The driving voltage supply lines VL1 to VLn are parallel to the gate lines G0 to Gn and formed on the lower substrate of the liquid crystal display panel 10. The readout lines ROL1 to ROLm are perpendicular to the gate lines G0 to Gn. As shown in FIG. 14, a pixel circuit P1 is formed at each region where the data lines D1 to Dm and the gate lines G0 to Gn cross, and a touch sensor circuit P2 is formed in a region where the driving voltage supply lines VL1 to VLn and the readout lines ROL1 to ROLm cross. The driving voltage supply lines VL1 to VLn each include first supply lines VL1$a$ to VLn$a$ for supplying a driving voltage to the touch sensor circuit P2 and second supply lines VL1$b$ to VLn$b$ for supplying a bias voltage to the touch sensor circuit P2. The touch sensor circuit P2 generates the touch/non-touch sensing signal TS depending on the touch or non-touch operation and supplies the touch/non-touch sensing signal TS to the readout IC 80 through the readout lines ROL1 to ROLm.

A black matrix is formed on the upper substrate of the liquid crystal display panel 10 to cover an interface between the pixels P. A common electrode and a pixel electrode are on opposite sides of the liquid crystal layer. The common electrode receiving a common voltage is formed on the upper substrate of the liquid crystal display panel 10 in a vertical electric mode such as a twisted nematic (TN) mode and a vertical alignment (VA) mode. In a transverse electric mode such as an in-plane switching (IPS) mode and a fringe field switching (FFS) mode, the common electrode is formed on the lower substrate of the liquid crystal display panel 10.

The data drive circuit 20 converts digital video data RGB into an analog gamma compensation voltage based on a gamma reference voltage generated by a gamma reference voltage generation unit (not shown) in response to a data control signal DDC produced by the timing controller 40. The analog gamma compensation voltage serving as a data voltage is supplied to the liquid crystal display panel 10. The gate drive circuit 30 generates scan pulses in response to a gate control signal GDC produced by the timing controller 40 and sequentially supplies the scan pulses to the gate lines G1 to Gn to select horizontal lines of the liquid crystal display panel 10 to which the data voltage is supplied.

The timing controller 40 rearranges the digital video data RGB received from a system 90 in conformity with the liquid crystal display panel 10 and supplies the digital video data RGB to the liquid crystal display panel 10. The timing controller 40 produces the data control signal DDC for controlling the data drive circuit 20, the gate control signal GDC for controlling the gate drive circuit 30, and a readout control signal RDC for controlling the readout IC 80 using timing control signals Vsync, Hsync, DCLK, and DE received from the system 90.

The backlight unit 70 is positioned in the rear of the liquid crystal display panel 10 and includes a plurality of lamps installed to overlap the liquid crystal display panel 10. The lamp of the backlight unit 70 may include a cold cathode fluorescent lamp (CCFL), an external electrode fluorescent lamp (EEFL), and a heat cathode fluorescent lamp (HCFL). The lamps provide light at the rear of the liquid crystal display panel 10 and driven by an inverter (not shown). The backlight unit 70 may include a plurality of light emitting diodes instead of the lamps or may include both the lamps and the light emitting diodes.

Figure 5:
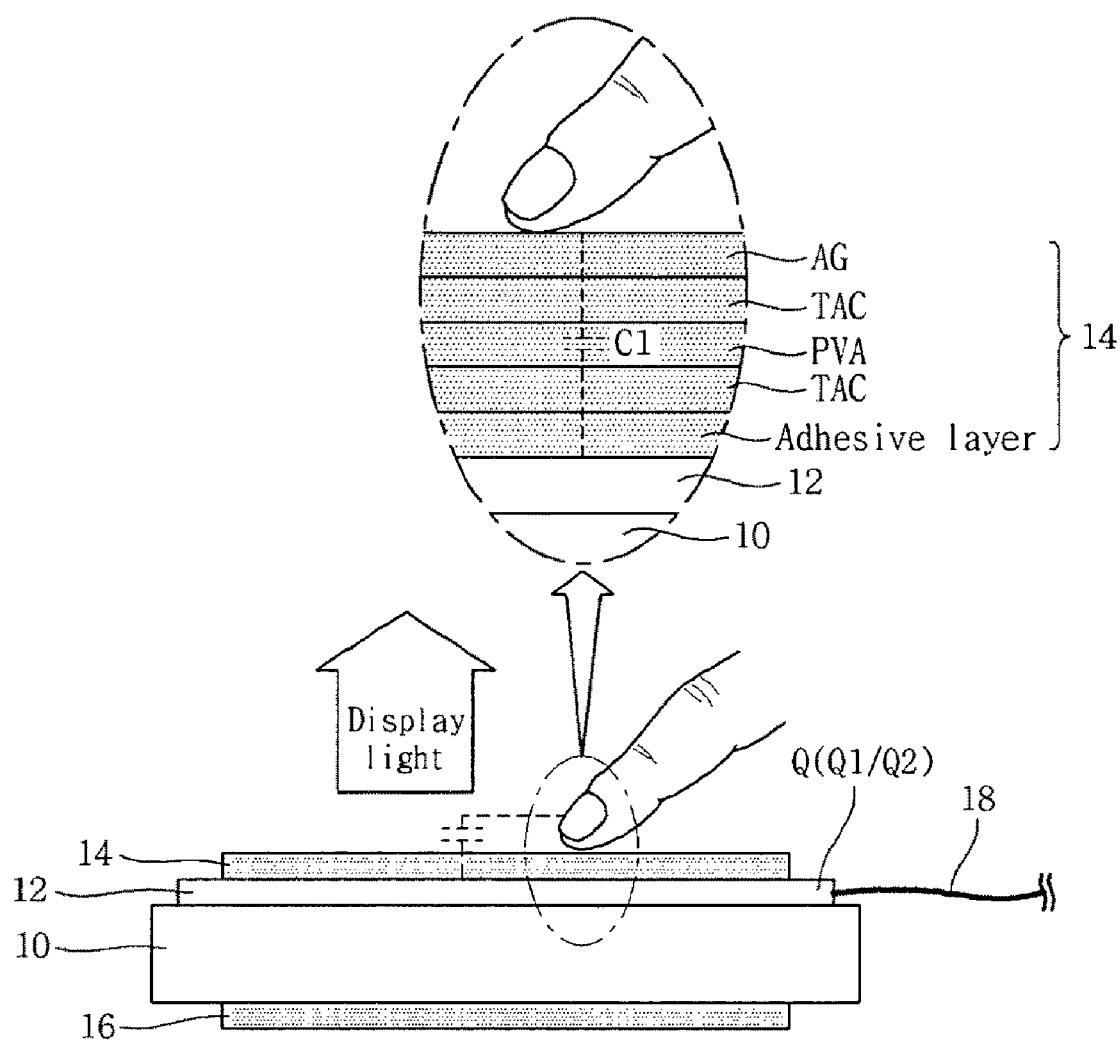
FIG. 5 illustrates a first exemplary method for forming an equivalent capacitor.

As shown in FIG. 5, upper and lower polarizing plates 14 and 16 for selecting linear polarization are formed on the upper and lower substrates of the liquid crystal display panel 10, respectively. Each of the upper and lower polarizing plates 14 and 16 are generally formed of a plurality of organic material layers including polyvinyl alcohol (PVA) being a high polymer polarization medium layer for polarizing incident light. When the user touches the upper polarizing plate 14 with his/her finger, all or some of the organic material layers of the upper polarizing plate 14 are positioned between the user's finger and a transparent conductive layer 12 serving as electrodes to serve as a dielectric of an equivalent capacitor. Hence, the amount of the surface charge Q1 of the transparent conductive layer 12 when the upper polarizing plate 14 is touched is different from the amount of the surface charge Q2 of the transparent conductive layer 12 when the upper polarizing plate 14 is not touched due to the capacitive effect of the equivalent capacitor formed by the user's finger. Changes in the amount of surface charge Q during the touch and non-touch operations are supplied to the sensing circuit 50 through a signal transmitting unit 18 to detect whether or not the liquid crystal display panel 10 is touched. As above, the equivalent capacitor is used to extract the changes in the amount of surface charge Q during the touch and non-touch operations, and there are several methods for forming the equivalent capacitor.

As a first exemplary method for forming an equivalent capacitor, as shown in FIG. 5, the transparent conductive layer 12 formed of a material such as indium-tin-oxide (ITO) and indium-zinc-oxide (IZO) is formed between the upper polarizing plate 14 transmitting display light and the upper substrate of the liquid crystal display panel 10. When the user touches the upper polarizing plate 14 with his/her finger, the user's finger and the transparent conductive layer 12 serve as electrodes of an equivalent capacitor C1 and the upper polarizing plate 14 serves as a dielectric of the equivalent capacitor C1. The upper polarizing plate 14 includes the plurality of organic material layers such as a polyvinyl alcohol (PVA) layer for polarizing incident layer, a tri-acetyl-cellulose (TAC) layer for protecting the PVA layer, an anti-glaring (AG) layer for glare prevention, and an adhesive layer used to attach the upper polarizing plate 14 to the transparent conductive layer 12. The upper polarizing plate 14 shown in FIG. 5 may be replaced with a conductive polarizing plate 24 shown in FIG. 6.

Figure 6:
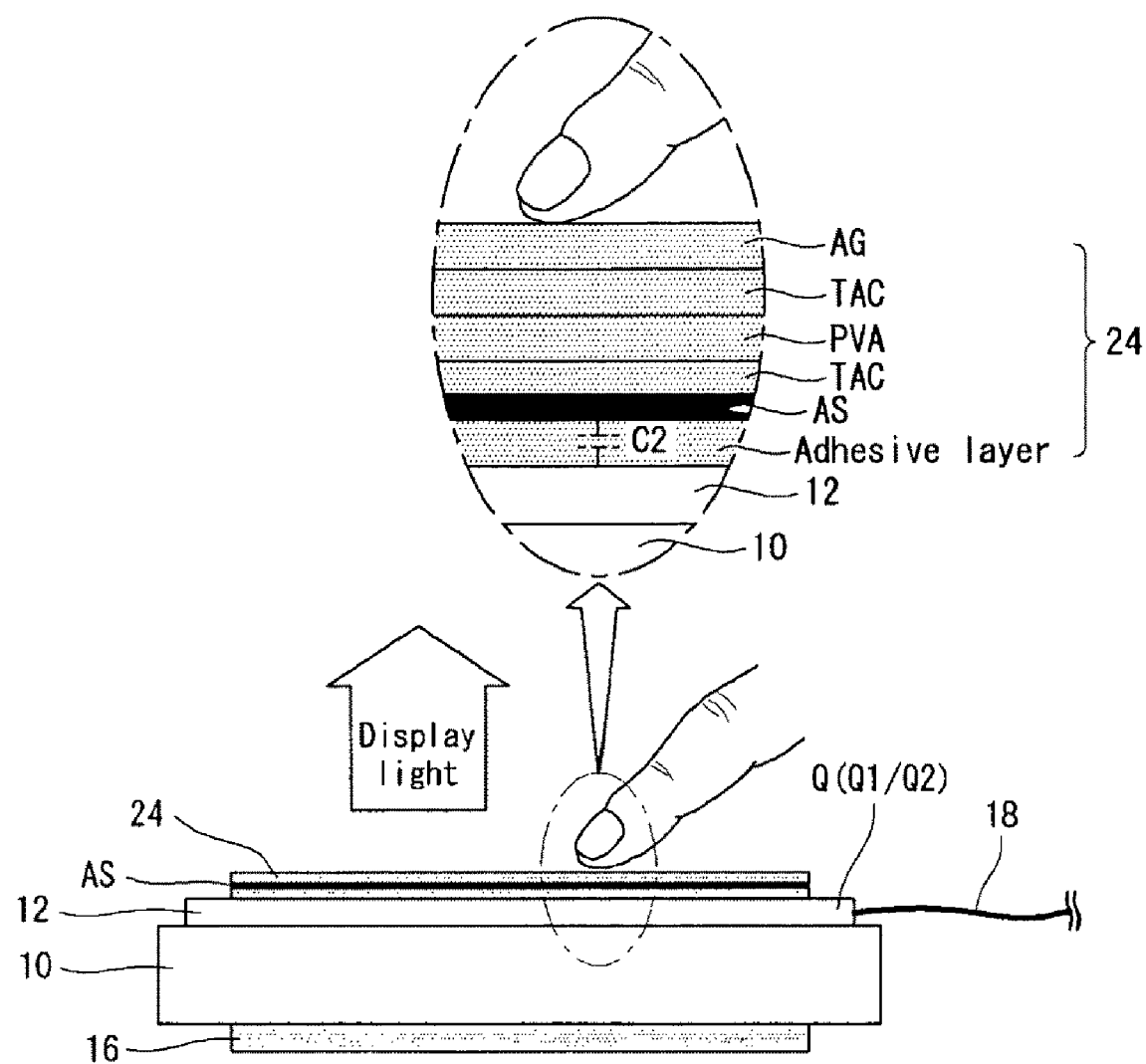
FIG. 6 illustrates a second exemplary method for forming an equivalent capacitor.

As a second exemplary method for forming an equivalent capacitor, as shown in FIG. 6, the conductive polarizing plate 24 further includes a conductive layer AS between an adhesive layer and a TAC layer. The conductive layer AS and the transparent conductive layer 12 serving as electrodes are on opposite sides of the adhesive layer serving as a dielectric to form an equivalent capacitor C2. The signal transmitting unit 18 is connected to the transparent conductive layer 12 to supply changes in the amount of surface charge Q of the transparent conductive layer 12 during touch and non-touch operations to the sensing circuit 50.

Figure 7:
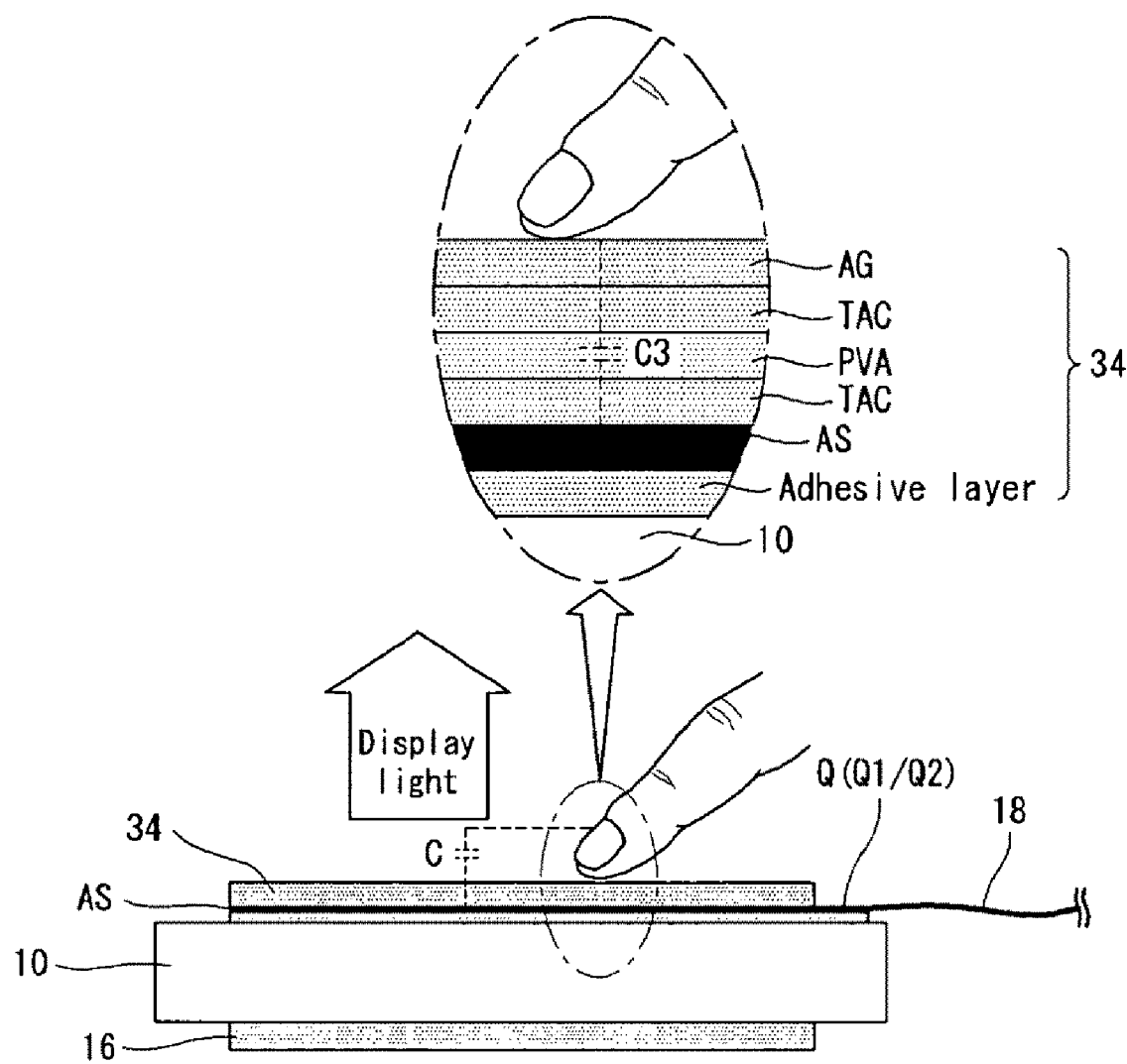
FIG. 7 illustrates a third exemplary method for forming an equivalent capacitor.

As a third exemplary method for forming an equivalent capacitor, as shown in FIG. 7, only a conductive upper polarizing plate 34 may be used to form an equivalent capacitor without the transparent conductive layer. The conductive polarizing plate 34 further includes a conductive layer AS between an adhesive layer and a TAC layer. The user's finger and the conductive layer AS serving as electrodes are on opposite sides of a plurality of organic material layers such as an AG layer, a TAC layer, and a PVA layer serving as a dielectric to form an equivalent capacitor C3. The signal transmitting unit 18 is connected to the conductive layer AS to supply changes in the amount of surface charge Q of the conductive layer AS during touch and non-touch operations to the sensing circuit 50.

Figure 8:
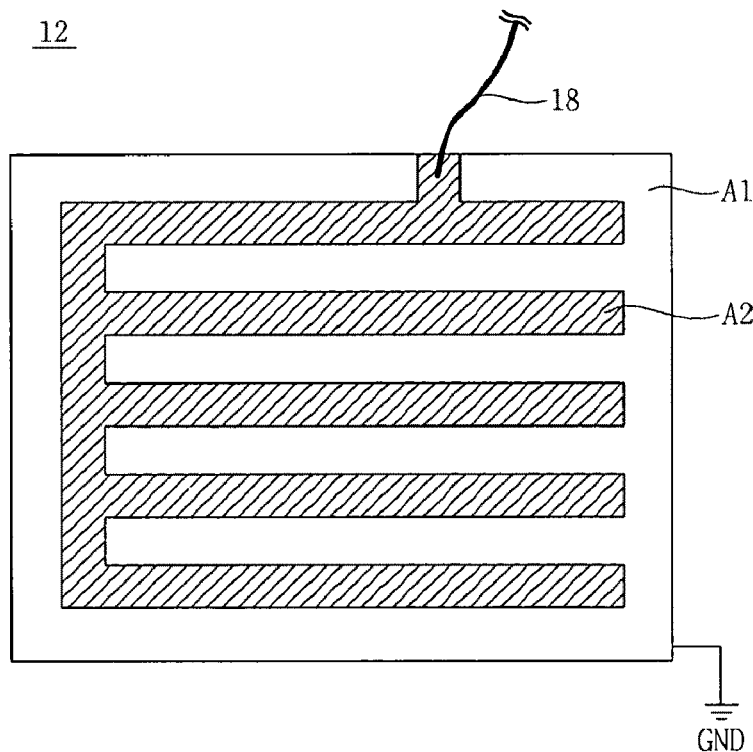
FIG. 8 illustrates a first exemplary method for removing a noise.

As a first exemplary method for removing a noise, as shown in FIG. 8, the transparent conductive layer 12 may include ground patterns A1 connected to a ground level voltage source GND and sensing conductive patterns A2 between the ground patterns A1, so as to remove a noise included in the changes in the amount of surface charge Q of the transparent conductive layer 12. As above, when the transparent conductive layer 12 includes the ground patterns A1, a noise caused by the common electrode is removed in the vertical electric mode in which the common electrode is formed on the upper substrate of the liquid crystal display panel 10. Hence, the sensing accuracy can be greatly improved.

Figure 9:
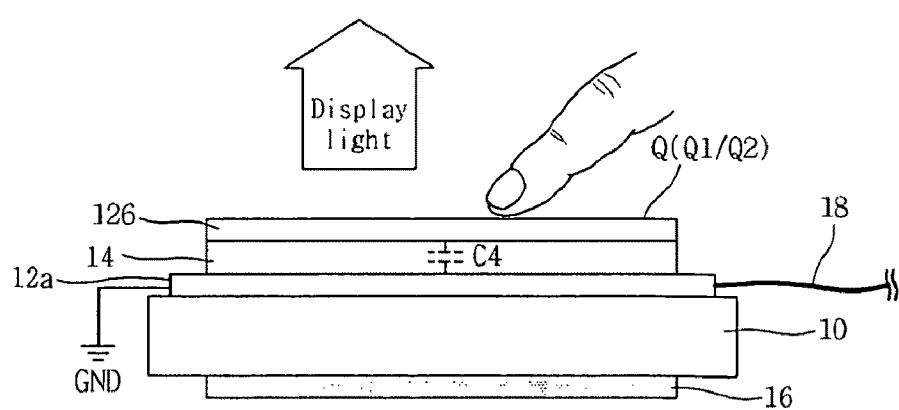
FIG. 9 illustrates a second exemplary method for removing a noise.

As a second exemplary for removing a noise, as shown in FIG. 9, an upper transparent conductive layer 12b is formed on the upper polarizing plate 14 to be connected to the ground level voltage source GND. A lower transparent conductive layer 12a is opposite to the upper transparent conductive layer 12b with the upper polarizing plate 14 therebetween. The transparent conductive layers 12a and 12b serving as electrodes are on opposite sides of the upper polarizing plate 14 serving as a dielectric to form an equivalent capacitor C4. The signal transmitting unit 18 is connected to the upper transparent conductive layer 12b to supply changes in the amount of surface charge Q of the upper transparent conductive layer 12b during touch and non-touch operations to the sensing circuit 50.

Figure 10:
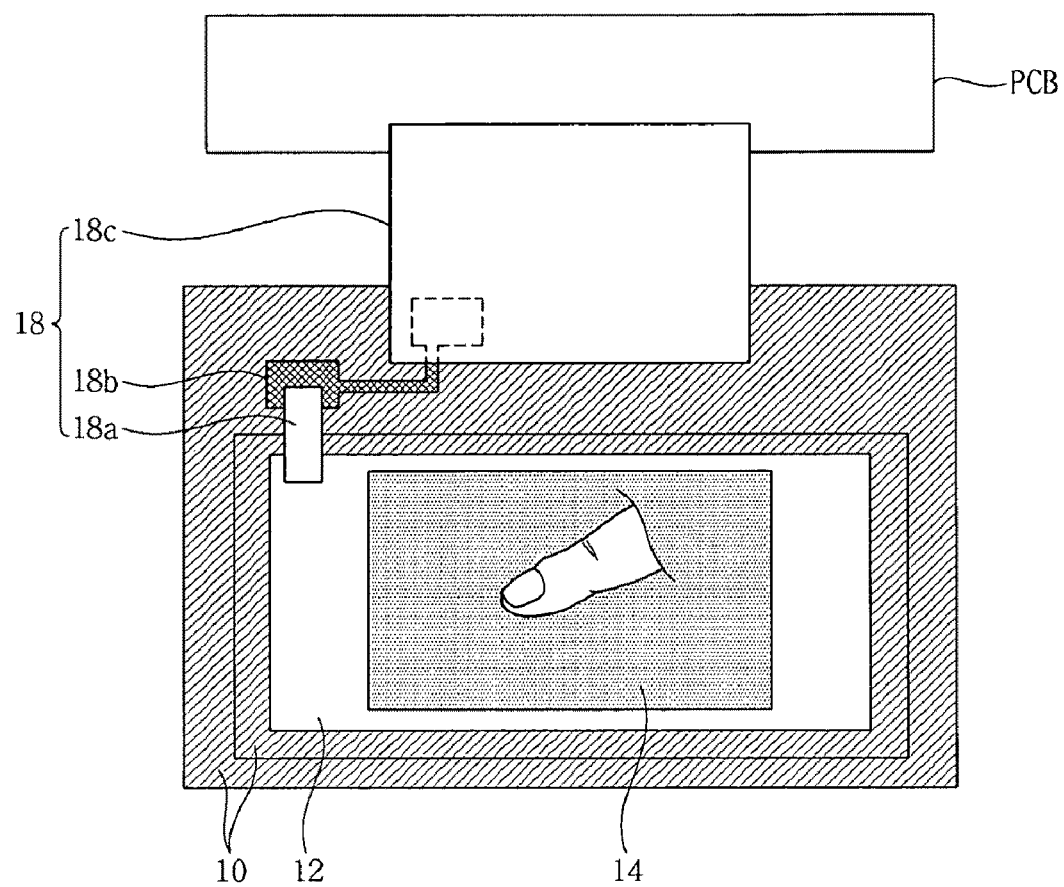
FIG. 10 illustrates a first exemplary configuration of a signal transmitting unit.

As shown in FIG. 10, the signal transmitting unit 18 includes a conductive tape 18a, a touch output pad 18b, and a flexible wiring film 18c. FIG. 10 shows that the conductive tape 18a electrically connects the transparent conductive layer 12 shown in FIGS. 5 and 6 to one surface of the touch output pad 18b. Although it is not shown, the conductive tape 18a electrically connects the conductive layer AS shown in FIG. 7 to one surface of the touch output pad 18b and electrically connects the transparent conductive layer 12b shown in FIG. 9 to one surface of the touch output pad 18b. The touch output pad 18b is formed on the lower substrate of the liquid crystal display panel 10 using a line-on-glass method. The touch output pad 18b includes a gate metal layer or a source-drain metal layer. The touch output pad 18b and gate pads or data pads of the lower substrate of the liquid crystal display panel 10 are formed on the lower substrate of the liquid crystal display panel 10. The flexible wiring film 18c includes a flexible printed circuit (FPC) and electrically connects the other surface of the touch output pad 18b to a printed circuit board (PCB). The data drive circuit 20, the gate drive circuit 30, the timing controller 40, the sensing circuit 50, and the driving voltage supply circuit 60 are mounted on the printed circuit board.

Figure 11:
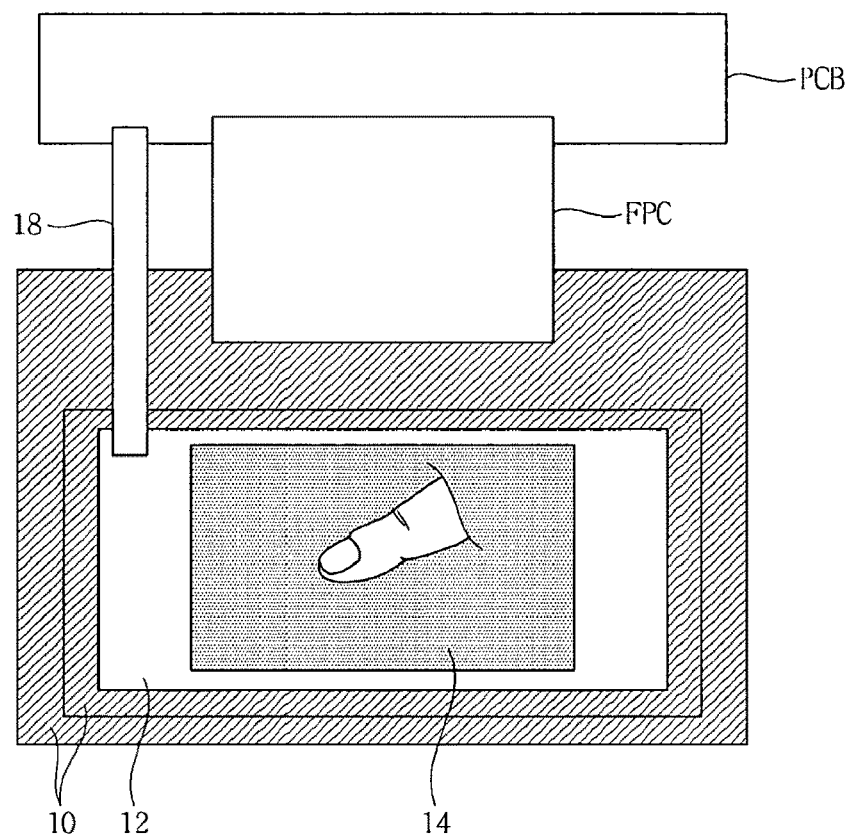
FIG. 11 illustrates a second exemplary configuration of a signal transmitting unit.

FIG. 11 shows the signal transmitting unit 18 that includes a flexible wiring film 18 in addition to a FPC. The flexible wiring film 18 directly connects the transparent conductive layer 12 to the PCB.

Figure 12:
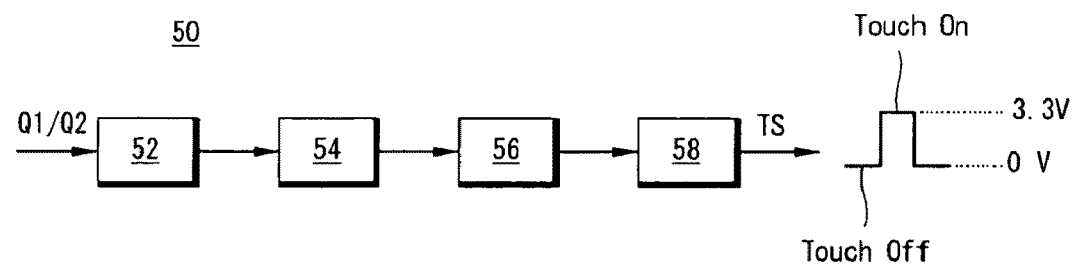
FIG. 12 illustrates an exemplary configuration of a sensing circuit shown in FIG. 4.

FIG. 12 illustrates an exemplary configuration of the sensing circuit 50 that includes a charge amount sensing unit 52, a QV converting unit 54, an AD converting unit 56, and a touch or non-touch sensing signal generation unit 58. The sensing circuit 50 senses the changes in the amount of surface charge and generates a touch or non-touch sensing signal.

The charge amount sensing unit 52 is connected to the signal transmitting unit 18 and senses the amount of surface charge Q of the transparent conductive layer 12 or 12b or the conductive layer AS of the polarizing layer. As an example, the amount of surface charge Q of the transparent conductive layer 12 is sensed. As described above, the amount of surface charge Q of the transparent conductive layer 12 has a different value during the touch and non-touch operations. For example, the amount of surface charge Q of the transparent conductive layer 12 during the touch operation has a first charge amount Q1, and the amount of surface charge Q of the transparent conductive layer 12 during the non-touch operation has a second charge amount Q2.

The QV converting unit 54 converts the amount of surface charge Q (i.e., the first charge amount Q1 or the second charge amount Q2) received from the charge amount sensing unit 52 into an analog voltage value. The AD converting unit 56 converts the analog voltage value received from the QV converting unit 54 into a digital voltage value.

The touch or non-touch sensing signal generation unit 58 produces the touch/non-touch sensing signal TS based on the digital voltage value received from the AD converting unit 56. The touch/non-touch sensing signal TS is generated as a touch signal when the digital voltage value of the first charge amount Q1 is present, and the touch/non-touch sensing signal TS is generated as a non-touch signal when the digital voltage value of the second charge amount Q2 is present. The touch/non-touch sensing signal TS is a transistor-to-transistor logic (TTL) signal swing between 0 V and 3.3 V.

Figure 13:
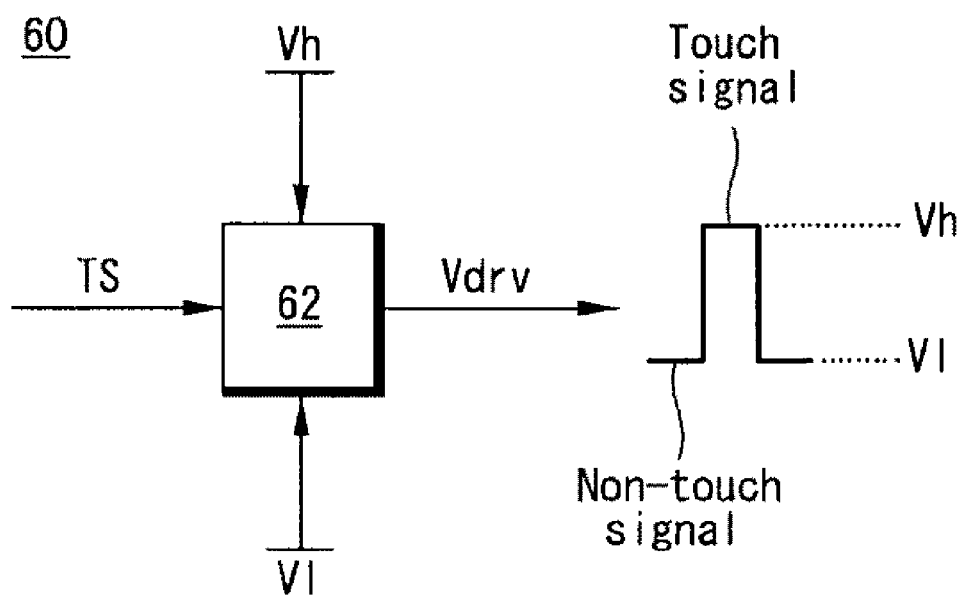
FIG. 13 illustrates an exemplary configuration of a driving voltage supply circuit shown in FIG. 4.

FIG. 13 illustrates an exemplary driving voltage supply circuit 60 that includes a level shifter 62. The level shifter 62 level-shifts the TTL level of the touch/non-touch sensing signal TS into a driving voltage level sufficient to drive the touch sensor circuit P2 inside the pixel P (FIG. 8). As a result of the level shifting operation, the driving voltage supply circuit 60 generates a driving voltage Vdrv swing between a high potential Vh and a low potential Vl to supply the driving voltage Vdrv to the first supply lines VL1a to VLna of the driving voltage supply lines VL1 to VLn. The touch sensor circuit P2 performs a light sensing operation when the driving voltage Vdrv of the high potential Vh is generated in response to the touch signal. The touch sensor circuit P2 stops the light sensing operation when the driving voltage Vdrv of the low potential V1 is generated in response to the non-touch signal. Although it is not shown, the driving voltage supply circuit 60 generates a bias voltage to supply the bias voltage to the second supply lines VL1b to VLnb of the driving voltage supply lines VL1 to VLn.

The readout IC 80 includes a plurality of circuits respectively connected to the readout lines ROL1 to ROLm of the liquid crystal display panel 10. The readout IC 80 converts a light sensing signal received from the readout lines ROL1 to ROLm into a digital signal to be supplied to the system 90. The system 90 performs a touch recognition process and a coordinate calculation process through a touch algorithm, and indicates the area of touch on the liquid crystal display panel 10.

FIG. 14 illustrates an equivalent circuit diagram of the pixel P briefly described above. As shown in FIG. 14, the pixel P includes a pixel circuit P1 at a crossing region of the j-th gate line Gj and the j-th data line Dj, and a touch sensor circuit P2 at a crossing region of the j-th first supply line VLja, the j-th second supply line VLjb, and the j-th readout line ROLj. The pixel circuit P1 includes liquid crystal cells Clc, a pixel thin film transistor (TFT) TFT1 for driving the liquid crystal cells Clc at a crossing region of the j-th gate line Gj and the j-th data line Dj, and a storage capacitor Cst1 that keeps a charging voltage of the liquid crystal cells Clc constant during one frame.

The pixel TFT TFT1 supplies the data voltage supplied through the j-th data line Dj to the pixel electrode of the liquid crystal cell Clc in response to the scan pulse received through the j-th gate line Gj. For this, the pixel TFT TFT1 includes a gate electrode connected to the j-th gate line Gj, a source electrode connected to the j-th data line Dj, and a drain electrode connected to the pixel electrode of the liquid crystal cell Clc. The liquid crystal cell Clc is charged with a voltage magnitude corresponding to a difference between the data voltage and the common voltage Vcom. The arrangement of liquid crystal molecules changes by an electric field formed by the voltage magnitude, and thus the amount of transmitted light may be controlled.

The touch sensor circuit P2 includes a sensor TFT S-TFT, a sensor capacitor Cst2, and a switch TFT TFT2. The sensor TFT S-TFT generates a light current "i" when the driving voltage Vdrv has a high potential Vh and does not generate the light current "i" when the driving voltage Vdrv has a low potential V1. The sensor capacitor Cst2 stores charges generated by the light current "i." The switch TFT TFT2 switches the charges stored in the sensor capacitor Cst2 to the readout line ROLj.

The sensor TFT S-TFT includes a gate electrode connected to the second supply line VLjb, a source electrode connected to the first supply line VLja, and a drain electrode connected to a first node N1. A bias voltage Vbias set at a voltage equal to or smaller than a threshold voltage of the gate electrode of the sensor TFT S-TFT is supplied to the gate electrode of the sensor TFT S-TFT. The driving voltage Vdrv swing between the high potential Vh and the low potential V1 is supplied to the source electrode of the sensor TFT S-TFT depending on whether or not the upper polarizing plate 14 is touched. The sensor TFT S-TFT performs a light sensing operation during when the driving voltage Vdrv is maintained at the high potential Vh in response to the touch operation, thereby increasing the accuracy of sensing operation. On the other hand, the sensor TFT S-TFT stops the light sensing operation during when the driving voltage Vdrv is maintained at the low potential V1 in response to the non-touch operation. Accordingly, degradation of the sensor TFT S-TFT that may be caused by continuous light sensing operation is avoided.

The sensor TFT S-TFT is not covered by the black matrix of the upper substrate unlike the pixel TFT TFT1 and the switch TFT2. Therefore, the sensor TFT S-TFT generates the light current "i" in response to the light coming from the outside when the driving voltage Vdrv is maintained at the high potential Vh. Furthermore, the amount of light current "i" generated by the sensor TFT S-TFT depends on whether or not the sensor TFT S-TFT corresponds to a touch position. For example, in an environment that is darker than the backlight (e.g., indoors), the sensor TFT S-TFT in a touch position generates a larger light current "i" than the sensor TFT S-TFT in a non-touch position. On the other hand, in an environment that is brighter than the backlight (e.g., outdoors), the sensor TFT S-TFT in a touch position generates a smaller light current "i" than the sensor TFT S-TFT in a non-touch position.

The sensor capacitor Cst2 connected between the first node N1 and the second supply line VLjb stores the charges generated by the light current "i." A voltage VN1 at the first node N1 gradually increases by the charges stored in the sensor capacitor Cst2 until the switch TFT TFT2 is turned on. The voltage VN1 at the first node N1 changes depending on whether or not the sensor TFT S-TFT is in a touch position when the driving voltage Vdrv is at the high potential Vh. For example, in an environment that is darker than the backlight (e.g., indoors), the voltage VN1 at the first node N1 is higher when the sensor TFT S-TFT is in a touch position than when the sensor TFT S-TFT is in a non-touch position. On the other hand, in an environment that is brighter than the backlight (e.g., outdoors), the voltage VN1 at the first node N1 lower when the sensor TFT S-TFT is in the touch position than when the sensor TFT S-TFT is not in the touch position. The voltage VN1 at the first node N1 is held at an initial value during when the driving voltage Vdrv is maintained at the low potential V1.

The switch TFT TFT2 includes a gate electrode connected to the (j−1)-th gate line Gj-1, a source electrode connected to the first node N1, and a drain electrode connected to the j-th readout line ROLj. The switch TFT TFT2 is turned on in response to the scan pulse SPj-1 supplied to the (j−1)-th gate line Gj-1 and thus outputs the voltage VN1 at the first node N1 as a light sensing signal to the j-th readout line ROLj.

Figure 15:
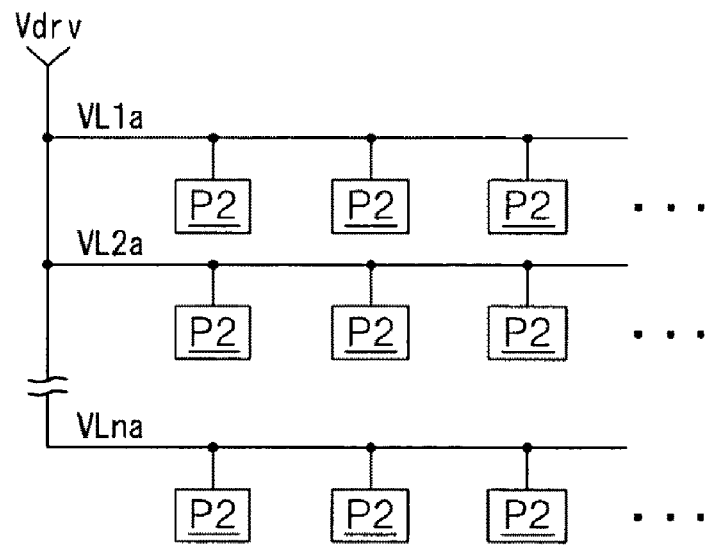
FIG. 15 illustrates an exemplary connection structure between touch sensor circuits.
Figure 16:
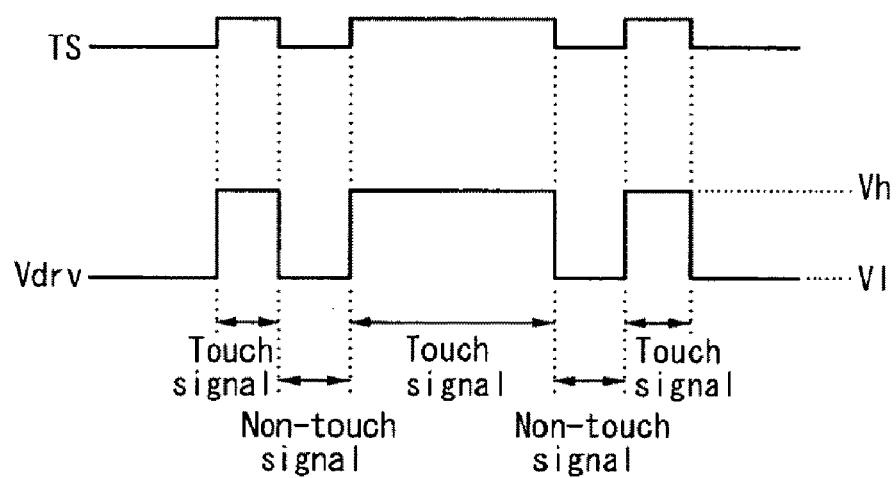
FIG. 16 is an exemplary waveform diagram of driving voltages applied to the touch sensor circuits of FIG. 15.

FIG. 15 illustrates a first exemplary connection structure between the touch sensor circuits P2. FIG. 16 is an exemplary waveform diagram of the driving voltage Vdrv applied to the touch sensor circuits P2 of FIG. 15.

As shown in FIGS. 15 and 16, the touch sensor circuits P2 are commonly connected to each of the first supply lines VL1a to VLna. Further, the first supply lines VL1a to VLna are commonly connected to receive the driving voltage Vdrv generated by the driving voltage supply circuit 60. In the present embodiment, the driving voltage Vdrv is at a high potential Vh during the on-time of the touch/non-touch sensing signal TS, and the driving voltage Vdrv is at a low potential V1 during the off-time of the touch/non-touch sensing signal TS. The liquid crystal display according to the exemplary embodiment of the invention generates the driving voltage Vdrv at the high potential Vh during only the on-time of the touch/non-touch sensing signal TS, and intermittently drives the touch sensor circuits P2 based on the driving voltage Vdrv of the high potential Vh. Accordingly, the accuracy of sensing operation can be greatly improved as compared with the related art, and the degradation of the sensor TFTs S-TFT inside the touch sensor circuits P2 can be greatly reduced as compared with the related art.

As described above, the liquid crystal display according to the exemplary embodiments of the invention accurately senses whether or not the user touches the liquid crystal display panel with his/her finger by detecting the changes in the amount of surface charge of the transparent conductive layer or the conductive layer inside the polarizing plate during the touch and non-touch operations, thereby greatly increasing the accuracy of sensing operation.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. A liquid crystal display comprising:
    a liquid crystal display panel including a pixel array that displays an image and touch sensors that sense a touch position depending on an amount of receiving light;
    a transparent conductive layer on one substrate of the liquid crystal display panel transmitting display light, a portion of the transparent conductive layer being connected to a ground level voltage source;
    a polarizing plate on the transparent conductive layer;
    a driving voltage supply circuit to generate a driving voltage required to perform light sensing operations of the touch sensors during a touch period based on changes in an amount of surface charge of the transparent conductive layer depending on whether or not the polarizing plate is touched; and
    a signal transmitting unit to electrically connect the transparent conductive layer to the driving voltage supply circuit,
    wherein when a user touches the polarizing plate with his or her finger, the polarizing plate serves as a dielectric to form an equivalent capacitor between the user's finger and the transparent conductive layer, and
    wherein the amount of surface charge of the transparent conductive layer has a different value during touch and non-touch operations.

2. The liquid crystal display of claim 1, wherein the signal transmitting unit includes:
    a touch output pad on another substrate of the liquid crystal display panel;
    a conductive tape to electrically connect the transparent conductive layer to one surface of the touch output pad;
    a printed circuit board on which the driving voltage supply circuit is mounted; and
    a flexible wiring film to electrically connect another surface of the touch output pad to the printed circuit board.

3. The liquid crystal display of claim 1, wherein the signal transmitting unit includes:
    a printed circuit board on which the driving voltage supply circuit is mounted; and
    a flexible wiring film to electrically connect the transparent conductive layer to the printed circuit board.

4. A liquid crystal display comprising:
    a liquid crystal display panel including a pixel array that displays an image and touch sensors that sense a touch position depending on an amount of receiving light;
    a transparent conductive layer on one substrate of the liquid crystal display panel transmitting display light, a portion of the transparent conductive layer being connected to a ground level voltage source;
    a polarizing plate on the transparent conductive layer;
    a driving voltage supply circuit to generate a driving voltage required to perform light sensing operations of the touch sensors during a touch period based on changes in an amount of surface charge of the transparent conductive layer depending on whether or not the polarizing plate is touched; and
    a signal transmitting unit to electrically connect the transparent conductive layer to the driving voltage supply circuit,
    wherein the polarizing plate includes a conductive layer and a dielectric layer between the conductive layer and the one substrate of the liquid crystal display panel,
    wherein when a user touches the polarizing plate with his or her finger, the dielectric layer serves as a dielectric to form an equivalent capacitor between the conductive layer and the transparent conductive layer, and
    wherein the amount of surface charge of the transparent conductive layer has a different value during touch and non-touch operations.

5. The liquid crystal display of claim 4, wherein the signal transmitting unit includes:
    a touch output pad on another substrate of the liquid crystal display panel;
    a conductive tape to electrically connect the transparent conductive layer to one surface of the output pad;
    a printed circuit board on which the driving voltage supply circuit is mounted; and
    a flexible wiring film to electrically connect another surface of the touch output pad to the printed circuit board.

6. The liquid crystal display of claim 4, wherein the signal transmitting unit includes:
    a printed circuit board on which the driving voltage supply circuit is mounted; and
    a flexible wiring film to electrically connect the transparent conductive layer to the printed circuit board.

* * * * *